June 12, 1934.  A. McL. NICOLSON  1,962,610
OSCILLATOR AND PLURAL CHANNEL TRANSMISSION SYSTEM
Filed Oct. 10, 1931  3 Sheets-Sheet 1

INVENTOR
Alexander McLean Nicolson
BY
ATTORNEY

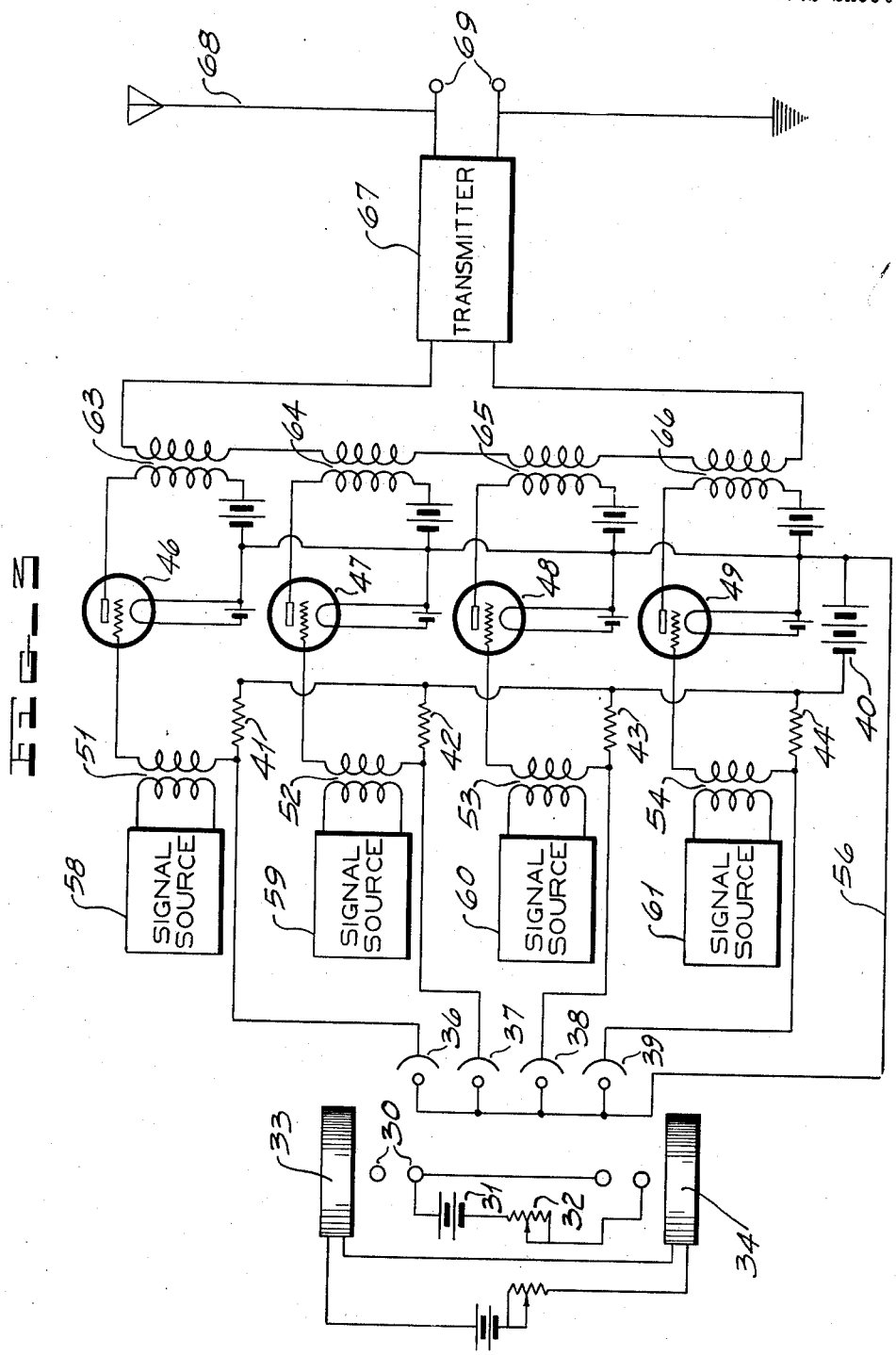

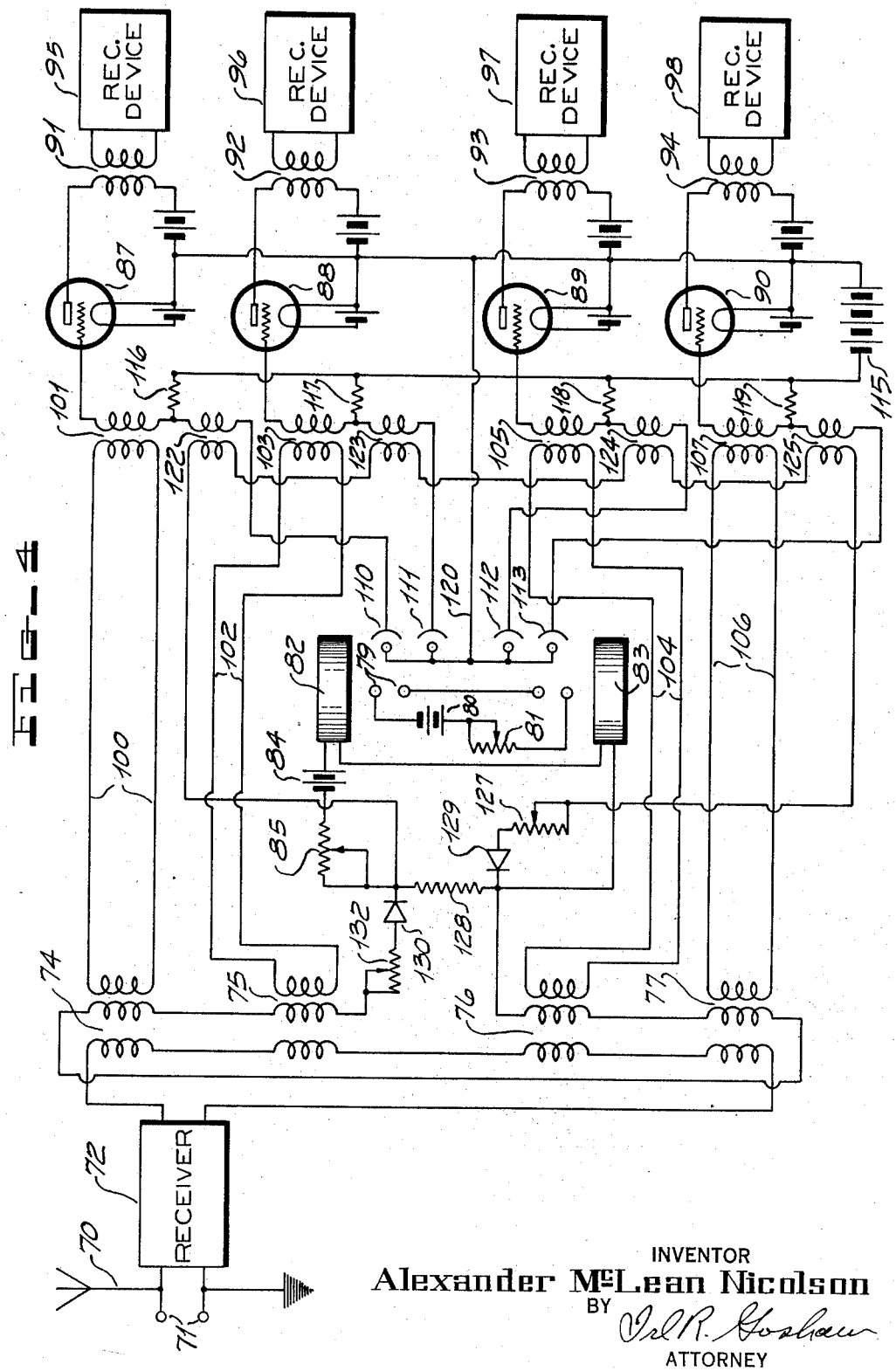

Patented June 12, 1934

1,962,610

UNITED STATES PATENT OFFICE 1,962,610

OSCILLATOR AND PLURAL CHANNEL TRANSMISSION SYSTEM

Alexander McLean Nicolson, New York, N. Y., assignor to Communication Patents, Inc., New York, N. Y., a corporation of Delaware Application October 10, 1931, Serial No. 568,012

5 Claims. (Cl. 250—9)

This invention relates to the generation of electrical current and particularly to oscillating systems, with impulse excitation, and systems for the transmission of a plurality of signals over a common conducting circuit.

Electrical oscillations generated by thermionic and crystal control generators are well known, such systems depending upon crystals for their frequency control and upon feed back characteristics for sustained operation. In the present oscillating circuit the frequency of generation of electrical impulses is accomplished by light from a moving electrical discharge which is controlled both as to its intensity and rate of propagation. The light is translated into electrical currents at a frequency depending upon the speed of the arc which may be easily maintained constant, as explained hereinafter, at any desired speed. The generated currents are then amplified and employed for any work circuit. In addition to the use of a rotating arc for the generation of oscillations, it is also applicable as a commutator control of plural channel signaling systems.

It is an object of this invention to generate stable electrical oscillations having a constant intensity.

Another object of the invention is to generate electrical impulses for controlling the output of a transmission circuit.

A further object of the invention is to control the time sequence of transmission of a plurality of signals over a common transmission medium.

Further objects and advantages of the herein described oscillating and signalling systems will be more fully understood by reference to the following description read in conjunction with the accompanying drawings in which:

Fig. 3 is a schematic diagram of a plural channel transmitter having a moving electrical discharge control, and Fig. 4 is a schematic circuit of the associate receiver for the transmitter of Fig. 3.

Figure 1:
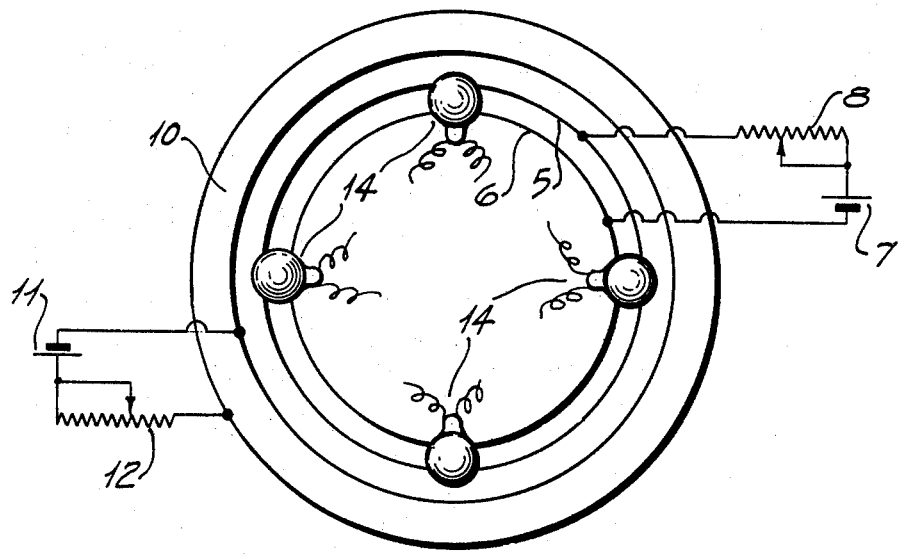
Fig. 1 is a diagrammatic view of a moving arc system with its associate light-to-current translators.

Referring particularly to Fig. 1 a circular pair of electrodes 5 and 6 are polarized from a source 7 under control of a rheostat 8. Surrounding the electrodes 5 and 6 is a field coil 10 energized from a source 11 under control of a rheostat 12. The rail electrodes 5 and 6 may be located in an evacuated envelope, a gas filled envelope, or exposed to the open air, depending upon the particular results desired. By manipulation of the rheostats 8 and 12 the intensity and speed of the arc is controlled approximately in accordance with the equation $S = KHli$, where S is the speed of the electrical discharge, H the field strength, $l$ the length of arc path, and $i$ the current in the arc. K in this equation is a constant depending upon wind friction, pressure and other local factors. In the system shown, the current in the arc is controlled by rheostat 8 and the strength of field 10 by the rheostat 12.

Located adjacent to the arc path and disposed along the electrodes are four photoelectric cells 14. It is to be understood, of course that any number of photocells may be employed and that they may be positioned in any order, regular or irregular so that the impulses created thereon have various phase relationships with respect to one another. That is, three phase impulses may be created by the disposition of three photoelectric cells 120° apart. Furthermore, the rails may have other configurations than circular, such as elliptical, rectangular or the like.

Figure 2:
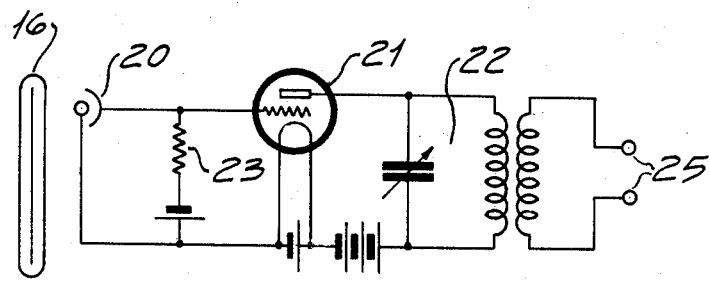
Fig. 2 is a schematic arrangement of an arc control oscillating system.

Referring now to Fig. 2 a continuous electrical discharge rail system 16 is represented as a straight line travel arc having a return path adjacent the outgoing path. With a uniform direction of field this system will produce a continuously moving arc. A system of this type has the photocells disposed in a line adjacent the arc paths and again any phase relationship may be produced in the cells by varying their position with respect to one another. As shown in the drawings, a single photoelectric cell 20 translates the light from the arc into electrical currents which are amplified in a thermionic amplifier 21 having a tuned plate circuit 22 tuned to the frequency of the impulses created in cell 20. The usual grid leak resistance 23 and electrode batteries are shown. A pair of output terminals 25 are provided to which may be connected any desired work circuit requiring the generated energy. It is to be understood that three of these circuits may co-operate simultaneously in a three phase relationship by placing the photocells in their proper relationship with respect to the moving arc as described above. Also any other polyphase currents may be generated by the appropriate arrangement of the cells along the arc path.

In Fig. 3 a plural channel transmission system utilizing a circular arc rail control device with its associate plurality of photoelectric cells is shown. In this circuit arc rails 30 are provided with potential from a source 31 under control of a rheostat 32. The arc is driven along its electrodes 30 by field coils 33 and 34 in series and so disposed as to produce a field flux at right angles to the arc path. In this system four channels are shown for purposes of explanation but it is to be understood that any number may be employed by the addition of further similar circuits.

Adjacent the arc rails are four photocells 36, 37, 38 and 39 having an energy source 40 supplying polarizing potential through resistances 41, 42, 43 and 44 respectively, the cells being connected to the control electrodes of vacuum tubes 46, 47, 48 and 49 through secondaries of input transformers 51, 52, 53, 54, respectively, over a common conductor 56. The vacuum tubes 46, 47, 48 and 49 have obvious filament and plate potential sources. The inputs of the four vacuum tubes are from signal sources 58, 59, 60 and 61, the signals therefrom being of any type such as telegraph, television or telephone current variations or any combination thereof. The output transformers 63, 64, 65 and 66 have their secondaries connected in series in a common output circuit and to a transmitter 67 which may broadcast the signals over antenna 68 or over wires connected to terminals 69. The secondaries of the output transformers may also be connected in parallel to the transmitter 67 depending upon the impedance characteristics of the circuits. In the operation of this system, the arc is created across the electrodes and the field energized to produce a rotating light source of the proper speed and intensity. The photoelectric cells which are positioned at equal distances adjacent the electrodes are energized at a rate depending upon the speed of the arc. As the arc actuates each cell in passing over a certain portion of the arc path, the impulse therefrom is impressed upon the respective vacuum tube connected to that cell. This action causes each tube to be operative in a serial order during the time that light impinges on that particular cell. Operation is accomplished by removing the heavy bias placed on the tubes by the polarizing source 40, the resistances 41, 42, 43 and 44 being so proportioned that the cell impulses permit the tubes to function during mutually exclusive time intervals. As the cells are energized in succession each tube and channel is made operative providing a time separation between the various channels. The theory of operation of such a time dividing system is also described in my copending application Serial No. 460,806 filed June 13, 1930.

Referring to Fig. 4 the receiving system for the transmitter circuit of Fig. 3 employs a receiver antenna 70 and wire input terminals 71 connected to a receiver 72, this receiver being appropriate to the type of transmitter 67 employed in Fig. 3. The output of the receiver is a circuit including the primaries of three winding transformers 74, 75, 76 and 77. A travelling arc system similar to that in Fig. 3 comprises electrode rails 79 and a potential supply 80, therefor under the control of a rheostat 81. The field for moving the arc along the rails 79 is produced by coils 82 and 83 supplied from a potential source 84 under static control of a rheostat 85.

There are four vacuum tubes 87, 88, 89 and 90, employed in the receiving system for the four channels, the outputs of which are connected through output transformers 91, 92, 93 and 94, respectively, to receiving devices 95, 96, 97 and 98 which are appropriate to the signal sources 58, 59, 60 and 61 at the transmitter. That is, the receiving devices may be telegraph sounders, telephone receivers, or televisors in accordance with the signals being transmitted. The circuits connecting the three winding transformers 74, 75, 76 and 77 to vacuum tubes 87, 88, 89 and 90 respectively, comprise conductors 100 and input transformer 101 for tube 87, conductors 102 and input transformer 103 for tube 88, conductors 104 and input transformer 105 for tube 89 and conductors 106 and input transformer 107 for tube 90.

Four photoelectric cells 110, 111, 112, 113 are connected to a source 115 for supplying polarizing potential through resistances 116, 117, 118 and 119 respectively, and common conductor 120. Connected in the circuits just traced for each individual photocell are the primaries of transformers 122, 123, 124 and 125, the secondaries of which are connected in series through a rheostat 127, rectifier 129, and resistance 128. Similarly connected to the circuit just traced are the third windings of the transformers 74, 75, 76 and 77 through rheostat 132, rectifier 130, and resistance 128. These two circuits are for the purpose of synchronizing the moving arc at the receiver with that at the transmitter in order to make the proper receiver channel operative to receive the corresponding transmitter channel. The method of reception of the signals is identical to the method of transmission, that is, the arc travelling over its electrodes produces operativeness in the respective tubes in a serial order and at the same rate as they are made operative at the transmitter when the arcs are synchronized.

The synchronizing system operates as follows: The circuit including the third windings of the input transformer 74, 75, 76 and 77 produces across the resistance 128 a unidirectional voltage by action of the rectifier 130. The impulses in this circuit are produced by the transmitter since the circuit is connected to the incoming line. The circuit including the secondaries of transformers 122, 123, 124 and 125 produces a voltage across resistance 128 in the reverse direction by the action of rectifier 129. These latter impulses are produced by the receiver arc as it controls the receiving tubes 87, 88, 89 and 90. Now when the arcs are properly synchronized, that is, travelling at the same and at a uniform speed, then, the impulses produced in common resistance 128 are neutralized and no increase or decrease in field strength occurs as the resistance 128 is in the field control circuit for the arc. However, should the receiver or transmitter arc tend to vary in speed or wander from synchronism, a differential current will be produced across the resistance 128 in a direction proper to either decrease or increase the field. That is, should the receiver arc decrease in speed for any reason whatsoever, a differential voltage will be produced across resistance 128, to increase the field strength and bring the arc back to normal. Similarly should the transmitter arc decrease its rate of propagation along the electrodes, the differential voltage across the resistance 128 will vary the receiver arc speed to that at the transmitter. The reverse action is also obvious when increases occur in the speeds of either arc. It is to be observed, therefore, that it is impossible when the synchronizing circuit is operating to interchange the channels or prevent proper selectivity.

It is to be understood, of course, that any number of channels may be added to the present system, the synchronizing circuit operating the same for any combination. Also other uses of the impulses created by the moving electrical discharge will occur to those skilled in the art and any equivalent systems are contemplated to be within the scope of the appended claims.

What is claimed is:

1. In a plural channel transmission system, a transmitter circuit including a moving electrical discharge device, a plurality of signal sources connected to a common transmission medium, individual circuits connected to said sources including thermionic devices, means for translating light from said electrical discharge into electrical impulses for controlling said thermionic devices in accordance with the rate of propagation of said electrical discharge, a second moving electrical discharge device at a receiving point, a plurality of receiving devices at said receiving point corresponding to the signal sources at said transmitter under control of a corresponding plurality of thermionic devices, means for translating light from said second electrical discharge device into electrical impulses for controlling said last-mentioned thermionic devices, in accordance with the operation of said corresponding devices at the transmitter, and means connected to said discharge devices for synchronizing the moving discharges of said devices, said means including an impedance at one of said electrical discharge devices upon which the impulses initiated by both of said devices are impressed.

2. In a plural channel transmission system, a plurality of signal sources the signals from which are to be transmitted over a common transmission medium to corresponding receiving devices, a moving electrical discharge device at said transmitter for controlling the order of transmission of said signals, a similar discharge device associated with said receiving device for controlling the order of reception of said signals, means at said receiving devices for impressing on the field of said receiving discharge device the impulses from said transmitter discharge device, means for impressing upon the field of said receiving discharge device the impulses generated by said receiving discharge device, and means for utilizing the differential current between the impulses of each discharge device for controlling the rate of propagating of the discharge at said receiving device.

3. In combination, electrode rails, means for creating an electromagnetic field in which said rails are positioned, means for creating an arc between said rails adapted to be propagated therealong by said field, means for translating light from said arc into electrical impulses for transmission to a distant point, a similar arc rail and electromagnetic field arrangement at said receiving point, means at said receiving point for controlling the strength of the electromagnetic field at said point, means for impressing the impulses generated by said first arc on said field controlling means, and means for impressing the impulses generated by said second arc on said field controlling means, the impulses from each of said arcs neutralizing each other when the speeds thereof are the same and varying the field strength of said second arc to cause said second arc to follow the speed variations of said first arc.

4. The method of synchronizing two moving arcs in separate magnetic fields comprising generating separate electrical impulses with said arcs in a definite order, impressing said impulses upon the magnetic field of one of said arcs, said impulses neutralizing the effect upon said field when said arcs are in synchronism and decreasing and increasing the field of said controlled arc in accordance with the direction in shift in speed of one of said arcs.

5. In a plural channel transmission system, a moving electrical discharge device at one station, a similar discharge device at a second station, means at said second station for impressing on the field of said second station discharge device impulses generated by the discharge device at said first station, means for impressing upon the field of said second station discharge device impulses generated by said second station discharge device, and means for utilizing the differential current between the impulses generated by each impulse device for controlling the rate of propagation of the discharge of the said second station device.

ALEXANDER McLEAN NICOLSON.